United States Patent [19]

Nishikawa et al.

[11] Patent Number: 4,937,098

[45] Date of Patent: Jun. 26, 1990

[54] METHOD FOR MANUFACTURING A MAGNETIC RECORDING MEDIUM

[75] Inventors: Yasuo Nishikawa; Mikio Ohno; Masaaki Fujiyama; Tsutomu Okita, all of Kanagawa, Japan

[73] Assignee: Fuji Photo Film Co., Ltd., Kanagawa, Japan

[21] Appl. No.: 340,743

[22] Filed: Apr. 20, 1989

[30] Foreign Application Priority Data

Apr. 20, 1988 [JP] Japan ................................ 63-95431

[51] Int. Cl.$^5$ ............................................. H01F 10/02
[52] U.S. Cl. .................................... 427/132; 427/127; 428/694; 428/900
[58] Field of Search .................... 427/127–132, 427/48; 428/694, 900

Primary Examiner—Bernard Pianalto
Attorney, Agent, or Firm—Sughrue, Mion, Zinn, Macpeak & Seas

[57] ABSTRACT

A method for manufacturing a magnetic recording medium is disclosed, comprising ferromagnetic alloy powders having an average length in the long axis of 0.3 μm or less and a specific surface area (BET Method) of 45 m$^2$/g or more, by steps which comprise surface-treating the ferromagnetic alloy powders with at least one triazine thiol compound, dispersing the surface-treated powders in a binder, and then coating the binder containing the surface-treated powders on a nonmagnetic support, wherein the ferromagnetic alloy powders are surface-treated with a triazine thiol compound represented by formula (I) in a condition in which the moisture content of the ferromagnetic alloy powders is 0.5 wt % or less, in a system of substantially excluded moisture:

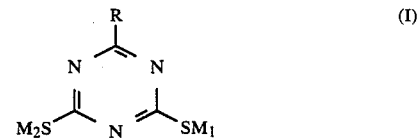

(I)

wherein R represents $R_1O-$, $R_1S-$, $R_1NH-$, or $R_1R_2N-R_1-$, $R_1$ and $R_2$, which may be the same or different, each represents an alkyl, alkenyl, aryl, aralkyl, cycloalkyl or alkanol group having from 1 to 18 carbon atoms, and $M_1$ and $M_2$, which may be the same or different, each represents H, alkali metal or ammonium.

6 Claims, No Drawings

METHOD FOR MANUFACTURING A MAGNETIC RECORDING MEDIUM

FIELD OF THE INVENTION

The present invention relates to a method for manufacturing a magnetic recording medium, and more particularly, relates to a method for manufacturing a magnetic recording medium of excellent electromagnetic characteristics, running durability, and storage stability.

BACKGROUND OF THE INVENTION

Along with an increased demand for magnetic recording media with ever higher density recording, there is a demand for durability and storage stability under different environments.

Various investigations are underway for surface treatment of magnetic powders, made from ferromagnetic alloy powder, to impart stability to the magnetic powder surface and dispersibility to the magnetic powder, in order to obtain magnetic recording media having excellent electromagnetic characteristics, durability and storage stability. For example, phosphate compounds, silane coupling agents and so on have been used to surface-treated ferromagnetic alloy powders.

In recent years, there have been, in particular, proposals for using compounds containing triazine rings as surface treatment agents for ferromagnetic powders. See JP-A-61-96519 (the term "JP-A" as used herein refers to a "published unexamined Japanese patent application").

However, even with surface treatment by these triazine treatment agents, it has not been possible to obtain satisfactory dispersibility, running durability and storage stability in the case of those ferromagnetic alloy powders which are in the form of comparatively fine particles. It has been even more difficult to obtain the above properties when using ferromagnetic alloy fine powders which have an adsorbed amount of a $C_{10}$ to $C_{22}$ fatty acid of $5 \times 10^{-6}$ mol/m² or more. Such fatty acid-treated ferromagnetic alloy fine powders are particularly excellent in electromagnetic characteristics.

SUMMARY OF THE INVENTION

An object of the present invention is to provide a method for manufacturing magnetic recording media that are improved in the three properties of electromagnetic characteristics, running durability and storage stability.

Another object of the present invention is to provide a method for manufacturing a magnetic recording medium having excellent electromagnetic characteristics, as well as showing excellent running durability by remaining stable even under temperature fluctuations and humidity fluctuations, and as well as maintaining its initial stable performance even during long term storage under rigorous conditions of high temperature and high humidity.

To achieve the foregoing objects, the present invention provides a method for manufacturing a magnetic recording medium comprising ferromagnetic alloy powders having an average length in the long axis of 0.3 µm or less and a specific surface area (BET Method) 45 m²/g or more, by steps which comprise surface-treating the ferromagnetic alloy powders with at least one triazine thiol compound, dispersing the surface-treated powders in a binder, and then coating the binder containing the surface-treated powders on a nonmagnetic support, wherein the ferromagnetic alloy powders are surface-treated with a triazine thiol compound represented by formula (I) in a condition in which the moisture content of the ferromagnetic alloy powder is 0.5 wt. % or less, in a system of substantially excluded moisture:

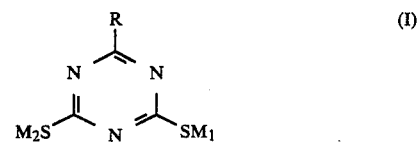

wherein R represents $R_1O—$, $R_1S—$, $R_1NH—$, or $R_1R_2N—R_1—$, $R_1$ and $R_2$, which may be the same or different, each represents an alkyl, alkenyl, aryl, aralkyl, cycloalkyl or alkanol group having from 1 to 18 carbon atoms, and $M_1$ and $M_2$, which may be the same or different, each represents H, alkali metal or ammonium.

Further, in the present invention, it is preferred to perform the surface treatment of the ferromagnetic alloy powders having an average length in the long axis of 0.3 µm or less and a specific surface area (BET Method) of 45 m²/g or more by mixing and stirring at least one triazine thiol compound represented by formula (I) in N gas, or to perform the surface treatment by dipping the ferromagnetic alloy powders in a solution of the triazine thiol compound represented by formula (I), dissolved in a dehydrated solvent.

Thus, the present inventors, in the course of detailed investigations of surface treatment methods for ferromagnetic alloy fine powders by means of the above triazine thiol compounds, discovered that by performing the surface treatment with a system wherein the moisture content of the magnetic material is 0.5% or less, it is possible to obtain magnetic recording media having electromagnetic characteristics, running durability and storage stability that are superior by several orders of magnitude to the case of treatment by prior methods.

DETAILED DESCRIPTION OF THE INVENTION

In the present invention, when the comparatively fine ferromagnetic alloy powder having an average in the long axis of 0.3 µm or less and a specific surface area (BET Method) of 45 m²/g or more is surface-treated with the triazine thiol compound represented by formula: (I), the moisture content of the ferromagnetic alloy powder is kept at 0.5 wt. % or less. The ferromagnetic alloy powder is first treated to bring its moisture content to 0.5 wt. % or less, and then surface treatment with the triazine thiol is done with a system from which moisture is substantially excluded, that is, with an anhydrous or substantially anhydrous system. When the ferromagnetic alloy powder that has been surface-treated in this manner is dispersed in a binder and furnished as a magnetic layer by coating onto a nonmagnetic support and drying, it is possible to obtain a magnetic recording medium that is excellent in running durability, storage stability and electromagnetic characteristics.

In the present invention, means such as vacuum drying, heating and drying at 100° C. to 120° C. in a nitrogen gas atmosphere, and heating and drying at 100° C. to 120° C. in a vacuum are used in order to make the moisture content of the ferromagnetic alloy powder 0.5 wt. % or less. In any of these cases, after drying, the temperature at which the ferromagnetic powder is taken out from the drying system is set high, and after being taken out from the drying system, the magnetic powder moisture content is kept precisely at 0.5 wt. % or less by means of, for example, a nitrogen purge.

Surface treatment of the thus-obtained ferromagnetic alloy powder with the triazine thiol compound represented by formula (I) can be done with a solvent system or a solventless system. When the surface treatment is done with a solventless system, the surface treatment is performed in dry air or in nitrogen. When the surface treatment is performed in a solvent system, a dehydrated solvent is employed.

Thus, the ferromagnetic alloy powder can be subjected to surface treatment comprising (1) mixing and stirring the magnetic powders with the thiol compound in dry air or in nitrogen or (2) dipping the magnetic powders in a solution of the triazine thiol compound dissolved in a dehydrated solvent.

It is considered that the functional effect of the dehydration and the triazine thiol compound is due to a reason why the adsorption of the triazine thiol compound is prevented in the presence of water since adsorption sites of the water and the triazine thiol compound are common on the magnetic powders.

In the case of a solvent system, an organic solvent such as benzene, alcohol such as methanol, ethanol, isopropanol, or toluene preferably is used. The solvent can be dehydrated, for example, in the case of benzene and toluene, by adding metallic sodium, calcium chloride or phosphorus pentoxide, or by distillation. In the case of alcohol, the solvent can be dehydrated by, for example, adding quick lime, or by further subsequent addition of calcium hydride, or by adding calcium carbonate and then boiling.

By these means, the moisture of about 3,000 ppm ordinarily contained in benzene and 10,000 to 50,000 ppm ordinarily contained in ethanol can be brought to 1,000 ppm and 2,000 ppm, respectively.

Moisture on the order of 2,000 ppm (about 2,000 ppm or less) in the solvent will be effective, but the effect will be even greater if the moisture is 1,000 ppm or less. More preferably the moisture is 500 ppm or less.

Among the preferred triazine thiol compounds as represented by formula (I) that are used in the surface treatment of the present invention, R, for example, can be $-N(C_4H_9)_2$, $-N(CH_3)_2$, $-NHC_4H_9$, $-NHC_{18}H_{37}$, $-NHC_{12}H_{25}$, $-OC_7H_{15}$, $-OC_{14}H_{29}$,

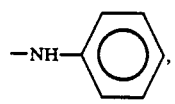

$-N(CH_2CH_2OH)_2$, and $-NHCH_2CH_2OH$, and $M_1$ and $M_2$, for example, can be H, Na, K, Li, $NH_4$, $NH(CH_2OH)_3$, and $NH_2(CH_2OH)_2$ (more preferably Na, K and $NH_4$).

An amount of the triazine thiol compounds used is preferably from 0.2 to 4.0 parts by weight per 100 parts by weight of the magnetic powders.

The following are specific examples of the triazine compounds which can be used.

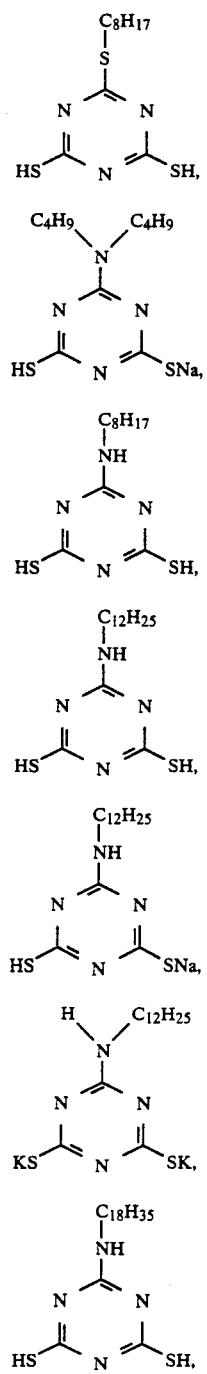

The ferromagnetic alloy powder used in the present invention is a ferromagnetic alloy powder having an average length in the long axis of 0.3 μm or less and a specific surface area of 45 m²/g or more (preferably 50 m²/g or more). The ferromagnetic alloy powder forms gradually oxidized film on the surface of the acicular alloy powder. The main component of the ferromagnetic alloy powder is iron, and this product with the gradually oxidized film furnished thereon in the condition of the gas phase imparts excellent properties. The alloy ingredients of the ferromagnetic alloy powder, other than iron, include, for example, Co, Ni, Zn, Co-Ni and Zn-Ni.

The binder that forms the magnetic layer can be selected from among ordinary and known thermoplastic, thermosetting and radiation setting binders. Examples of the binder that can be used include a vinyl chloride-vinyl acetate copolymer, a vinyl chloride-vinyl acetate and vinyl alcohol copolymer, a vinyl chloride-vinyl acetate and maleic acid copolymer, a vinyl chloride-vinyl acetate and acrylic acid copolymer, a vinyl chloride-vinylidene chloride copolymer, a vinyl chloride-acrylonitrile copolymer, an ethylene-vinyl acetate copolymer, cellulose derivatives such as a nitrocellulose resin, an acrylic resin, a polyvinyl acetal resin, a polyvinyl butyral resin, an epoxy resin, a phenoxy resin, a polyurethane resin and a polycarbonate polyurethane resin. Greater superiority in dispersibility will be obtained when using a "polar group-containing binder" that contains acid groups or their salts or amine groups, such as carboxylic acid groups, sulfonic acid groups, sulfate groups, phosphonic acid groups and phosphate groups from among the resins above, in which the polar group is present in an amount of $1 \times 10^{-6}$ to $1 \times 10^{-3}$ mol/g.

The total binder content in the magnetic layer for manufacture of the magnetic recording medium is ordinarily from 10 to 100 parts by weight and preferably from 20 to 40 parts by weight, per 100 parts by weight of the ferromagnetic alloy powder.

It is preferred that the magnetic layer of the magnetic recording medium also contain inorganic particles having a Mohs' hardness of 5 or more.

There are no particular restrictions in the inorganic particles used, as long as the Mohs' hardness is 5 or more. Examples of inorganic particles having a Mohs' hardness of 5 or more include $Al_2O_3$ (Mohs' hardness: 9), TiO (Mohs' hardness: 6), $TiO_2$ (Mohs' hardness: 6.5), $SiO_2$ (Mohs' hardness 7), $SnO_2$ (Mohs' hardness: 6.5), $Cr_2O_3$ (Mohs' hardness: 9) and $\alpha$-$Fe_2O_3$ (Mohs' hardness: 5.5), and these can be used singly or in mixtures.

Particularly preferred are inorganic particles having a Mohs' hardness of 8 or more. When comparatively soft inorganic particles having a Mohs' hardness of lower than 5 are used, the inorganic particles may easily fall out of the magnetic layer, and though there is almost no rubbing action of the head, clogging of the head may occur and the running durability may also be reduced.

The amount of inorganic particles added to the magnetic layer is ordinarily in the range of 0.1 to 20 parts by weight and preferably in the range of 1 to 10 parts by weight, per 100 parts by weight of the ferromagnetic alloy powder.

Besides the above inorganic particles, it is also preferred that the magnetic layer contain other additives, such as carbon black (particularly, substances whose average particle diameter is from 10 to 300 nm).

The method of manufacturing the magnetic recording medium is next explained step by step.

First, ferromagnetic alloy powders that have been surface-treated in accordance with the present invention, a binder, and other additives, if desired, are mixed and kneaded with a solvent, to prepare a magnetic coating composition. The solvent used during mixing and kneading can be a solvent ordinarily used in the preparation of a magnetic coating composition.

There are also no special restrictions as to the method of mixing and kneading, and matters such as the order of addition of the several ingredients can be handled as appropriate.

Mixing and kneading machines that can be used in the present invention include those ordinarily used in preparing magnetic coating compositions, such as, for example, two-rod roll mills, three-rod roll mills, ball mills, pebble mills, trommels, sand grinders, Segvariattritor, high speed impeller dispersers, high speed stone mills, high speed impact mills, Disper, kneaders, high speed mixers, homogenizers and ultrasonic dispersers.

When preparing the magnetic coating composition, it is also possible to make joint use of known additives such as dispersing agents, antistatic agents and lubricants.

Further, the magnetic coating composition of the present invention may contain a fatty acid such as stearic acid, oleic acid, palmitic acid, myristic acid and/or a fatty acid ester such as butylstearate, butoxyethylstearate, isotridecylstearate.

The magnetic coating composition that has been prepared in this manner is coated onto the known nonmagnetic support. It is possible to coat directly onto the nonmagnetic support, or it is possible to coat on the nonmagnetic support after interposition of an adhesive layer. Examples of materials for the known nonmagnetic support include polyesters, polyolefins, vinyl type resins, plastics, metals and ceramics.

Examples of methods for coating the magnetic coating composition onto the nonmagnetic support that can be used include, for example, air doctor coating, blade coating, rod coating, extrusion coating, air knife coating, squeeze coating, impregnation coating, reverse roll coating, transfer roll coating gravure coating, kiss coating, cast coating, spray coating and spin coating. It is also possible to use methods other than these.

Further details of methods for dispersing magnetic alloy powders and binders and methods for coating onto the supports are described in several patent publications such as JP-A-54-46011 and JP-A-54-21805.

The thickness of the magnetic layer coated in this manner is generally in the range of from about 0.5 to 10 $\mu$m after drying, and is preferably coated so as to be in the range of from 1.5 to 7.0 $\mu$m.

The magnetic layer can be a single layer, or may be constructed as multiple layers.

The magnetic layer coated onto the nonmagnetic support, in the case where the magnetic recording medium used is tape, is ordinarily subjected to orientation treatment to orient the ferromagnetic powder in the magnetic layer, that is, magnetic field orientation treatment, and then is dried. If desired, it may also be subjected to a surface smoothing treatment. The magnetic recording medium after surface smoothing treatment is then cut to the desired shape. The above orientation treatment and surface smoothing treatment are described in U.S. Pat. No. 3,473,960.

The present invention will be illustrated in more detail by the following Examples and Comparative Examples. In these Examples, the designation "parts" indicates "parts by weight" and all percentages are weight percentages unless otherwise indicated.

EXAMPLE 1

Magnetic Material Nos. 1 to 12 were prepared from Starting Magnetic Powders A to D and subjected to Treatments a to f. Table 1 below shows the combination of starting magnetic powder and treatment used to prepare each Magnetic Material Nos. 1 to 12. Table 2 below describes each Starting Magnetic Powders A to D in detail. Table 3 below describes each treatment a to d in detail.

TABLE 1

| Material No. | Starting Magnetic Powder | Treatment |
|---|---|---|
| 1 (Invention) | D | a |
| 2 (Invention) | D | b |
| 3 (Comparison) | D | c |
| 4 (Comparison) | D | d |
| 5 (Invention) | D | e |
| 6 (Comparison) | D | f |
| 7 (Invention) | C | a |
| 8 (Comparison) | C | c |
| 9 (Comparison) | A | a |
| 10 (Comparison) | A | c |
| 11 (Comparison) | B | a |
| 12 (Comparison) | B | c |

TABLE 2

| Starting Magnetic Powder | Description |
|---|---|
| A | Ferromagnetic alloy powder (composition: Fe 94 wt %, Zn 4 wt %, Ni 2 wt %) Coercive force: 1,500 oersteds Specific surface area: 54 m$^2$/g Moisture content: 1.5 wt % Stearic acid adsorption amount: 2.0 mg/g Average length in the long axis: 0.25 μm |
| B | Ferromagnetic alloy powder (composition: Fe 94 wt %, Zn 4 wt %, Ni 2 wt %) Coercive force: 1,500 oersteds Specific surface area: 54 m$^2$/g Moisture content: 1.0 wt % Stearic acid adsorption amount: 6.5 mg/g Average length in the long axis: 0.25 μm |
| C | Ferromagnetic alloy powder (composition: Fe 94 wt %, Zn 4 wt %, Ni 2 wt %) Coercive force: 1,500 oersteds Specific surface area: 54 m$^2$/g Moisture content: 0.3 wt % Stearic acid adsorption amount: 7.0 mg/g Average length in the long axis: 0.25 μm |
| D | Ferromagnetic alloy powder (composition: Fe 94 wt %, Zn 4 wt %, Ni 2 wt %) Coercive force: 1,500 oersteds Specific surface area: 54 m$^2$/g Moisture content: 0.4 wt % Stearic acid adsorption amount: 3.0 mg/g Average length in the long axis: 0.25 μm |

The moisture contents of the above magnetic materials (ferromagnetic alloy powders) were brought and controlled to the amounts shown in Table 2 by heating in a vacuum tank at 100° C.

The stearic acid adsorption amounts shown in Table 2 were measured in the following manner.

| Magnetic Powder | 5 g |
|---|---|
| Stearic Acid-Methyl Ethyl Ketone (MEK) Solution (2 wt % stearic acid) | 50 g |

The above were mixed, and stirred for 24 hours at 25° C.

After that they were centrifugally separated, the supernatant liquid was determined by potentiometric titration, and the difference in amount between it and the original solution was taken as the adsorbed amount.

TABLE 3

| Treatment Method | Details |
|---|---|
| a | Dibutylaminotriazine dithiol was dissolved in an amount of 2 wt % in benzene (H$_2$O less than 1,000 ppm) that had been dehydrated with metallic sodium to form a treating solution. The magnetic powder was then dipped into the solution. |
| b | Dibutylaminotriazine dithiol was dissolved in an amount of 2 wt % in toluene (H$_2$O less than 1,000 ppm) that had been dehydrated with metallic sodium to form a treating solution. The magnetic powder was then dipped into the solution. |
| c | Dibutylaminotriazine dithiol was dissolved in an amount of 2 wt % in benzene (H$_2$O about 3,000 ppm) that had not been given a dehydration treatment to form a treating solution. The magnetic powder was then dipped into the solution. |
| d | Dibutylaminotriazine dithiol was dissolved in an amount of 2 wt % in ethanol (H$_2$O about 10,000 ppm) that had not been given a dehydration treatment to form a treating solution. The magnetic powder was then dipped into the solution. |
| e | Dibutylaminotriazine thiol was added at 1.5 wt % of the magnetic material, in a nitrogen flow, and then mixed and kneaded. |
| f | No treatment was done. |

The compositions described below were kneaded and dispersed for 48 hours using a ball mill, after which 5 parts of polyisocyanate were added, then kneading and dispersing were done for 1 hour, after which filtration was done using a filter having mean hole diameters of 1 μm, to form the magnetic coating composition. The magnetic coating composition so obtained was coated with a reverse roller onto the surface of a polyethylene terephthalate support 10 μm thick, so that the thickness of the magnetic layer after drying was 4.0 μm.

| Magnetic Coating Composition | parts |
|---|---|
| Surface Treated (or untreated) Magnetic Alloy Magnetic Powder (see Table 1) | 100 |
| Vinyl Chloride/Vinyl Acetate/Maleic Acid Anhydride Copolymer (manufactured by Nippon Zeon K.K. (Japanese Geon Co., Ltd.), 400 × 100A, degree of polymerizaiton: 400) | 12 |
| Abrasive Agent (α-alumina, average particle diameter: 0.3 μm) | 5 |
| Stearic Acid | 1 |
| Isoheptyl Stearate | 1 |
| Carbon Black (average particle diameter: 40 nm) | 2 |
| Methyl Ethyl Ketone | 300 |

The nonmagnetic support coated with the magnetic coating composition was subjected to magnetic orientation with a magnet of 3,000 gauss under conditions where the magnetic coating was undried, and then after drying, supercalendering treatment was performed. Then, the calendered product was slit to 8 mm widths to make 8 mm video tapes.

7 MHz signals were recorded onto the video tape obtained in the above manner, using a VTR (FUJIX-8, manufactured by Fuji Photo Film Co., Ltd.) and were reproduced. The relative reproduction output of the video tape was measured, taking the reproducing output of the 7 MHz recorded on a standard tape as 0 dB. The standard tape was prepared from Magnetic Material No. 6 which is a material that had not been treated with a triazine thiol.

Each of the video tapes and a stainless ball were contacted (winding angle: 180°) under 50 g of tension (T1), and under these conditions, the tension (T2) necessary for the video tape to travel at a speed of 3.3 cm/s was measured. Based on these measurement values, the coefficient of abrasion $\mu$ of each video tape was obtained by following the calculation formula below.

$$\mu = 1/\pi \cdot ln(T2/T1)$$

* ln: natural logarithm

The coefficient of abrasion test was performed under two conditions: (X) 20° C., 70% RH, and (Y) 40° C., 80% RH.

Also, the same properties were measured after storage for three months under conditions of 60° C. and 90% relative humidity. The results are shown in Table 4, where the No. in Table 4 identifies the video tapes produced from the Magnetic Material identified by the corresponding No. in Table 1.

TABLE 4

| Sample No. | Initial Period | | | After Storage 3 Months at 60° C., 90% RH | | |
|---|---|---|---|---|---|---|
| | Reproduction Output | Abrasion Coefficient (X) | Abrasion Coefficient (Y) | Reproduction Output | Abrasion Coefficient (X) | Abrasion Coefficient (Y) |
| 1 | +2.0 | 0.19 | 0.22 | +2.0 | 0.18 | 0.22 |
| 2 | +2.0 | 0.20 | 0.23 | +2.0 | 0.20 | 0.24 |
| 3 (Comparison) | +0.5 | 0.25 | 0.30 | 0.0 | 0.29 | 0.04 or more |
| 4 (Comparison) | 0.0 | 0.30 | 0.4 or more | −1.0 | 0.35 | 0.04 or more |
| 5 | +2.0 | 0.20 | 0.22 | +2.0 | 0.21 | 0.22 |
| 6 (Comparison) | 0.0 | 0.32 | 0.4 or more | −0.5 | 0.36 | 0.04 or more |
| 7 | +1.0 | 0.22 | 0.24 | +1.0 | 0.22 | 0.24 |
| 8 (Comparison) | +0.5 | 0.25 | 0.30 | −0.5 | 0.27 | 0.04 or more |
| 9 (Comparison) | +0.5 | 0.26 | 0.4 or more | −0.5 | 0.30 | 0.04 or more |
| 10 (Comparison) | +0.5 | 0.25 | 0.33 | −0.5 | 0.31 | 0.04 or more |
| 11 (Comparison) | +1.0 | 0.27 | 0.35 | −1.5 | 0.31 | 0.04 or more |
| 12 (Comparison) | +0.5 | 0.26 | 0.36 | −1.0 | 0.30 | 0.04 or more |

As is apparent from the results in Table 4, Sample Nos. 1, 2, 5 and 7 that used the method of manufacture of the present invention all had high reproduction output, the coefficient of abrasion was low under both the (X) and the (Y) conditions, and they showed superior performance even after storage under rigorous conditions at high temperature and high humidity.

On the other hand, when surface treatment was done using commercial organic solvents without using the method of manufacture of the present invention, the reproduction capacity was low, and there were problems in reproduction output and in the coefficient of abrasion, particularly after storage at high temperature and high humidity.

The magnetic recording medium produced in accordance with the method of manufacture of the present invention is a medium that displays superior electromagnetic properties. Further, it has a long still life as video tape and displays excellent running durability, it shows a low coefficient of abrasion under a wide range of temperature and humidity conditions, and has further points of advantage in that deterioration in magnetic properties and deterioration in running durability do not tend to occur under long term storage. It also shows markedly high output and weather resistance when used in floppy disks.

While the invention has been described in detail and with reference to specific embodiments thereof, it will be apparent to one skilled in the art that various changes and modifications can be made therein without departing from the spirit and scope thereof.

What is claimed is:

1. A method for manufacturing a magnetic recording medium comprising ferromagnetic alloy powders having an average length in the long axis of 0.3 $\mu$m or less and a specific surface area (BET Method) of 45 m2/g or more, by steps which comprise surface-treating said ferromagnetic alloy powders with at least one triazine thiol compound, dispersing the surface-treated powders in a binder, and then coating said binder containing the surface-treated powders on a nonmagnetic support, wherein said ferromagnetic alloy powders are surface-treated with a triazine thiol compound represented by formula (I) in a condition in which the moisture content of said ferromagnetic alloy powders is 0.5 wt. % or less, in a system of substantially excluded moisture:

$$\text{(I)} \quad \begin{array}{c} R \\ | \\ N \diagup \diagdown N \\ \| \quad \quad \| \\ M_2S \diagdown N \diagup SM_1 \end{array}$$

wherein R represents $R_1O-$, $R_1S-$, $R_1NH-$, or $R_1R_2N-R_1-$, $R_1$ and $R_2$, which may be the same or different, each represents an alkyl, alkenyl, aryl, aralkyl, cycloalkyl or alkanol group having from 1 to 18 carbon atoms, and $M_1$ and $M_2$, which may be the same or different, each represents H, alkali metal or ammonium.

2. The method as claimed in claim 1, wherein said ferromagnetic alloy powders are subjected to surface treatment comprising mixing and stirring said alloy powders with said thiol compound in dry air or in nitrogen.

3. The method as claimed in claim 1, wherein said ferromagnetic alloy powders are subjected to surface treatment comprising dipping said magnetic powders in a solution of said triazine thiol compound dissolved in a dehydrated solvent.

4. The method as claimed in claim 3, wherein said solvent is benzene, alcohol or toluene having a moisture of 2,000 ppm or less.

5. The method as claimed in claim 4, wherein said alcohol is ethanol having a moisture of 2,000 ppm or less.

6. The method as claimed in claim 1, wherein R represents —N($C_4H_9$)$_2$, —N($CH_3$)$_2$, —NH$C_4H_9$, —NH$C_{18}H_{37}$, —NH$C_{12}H_{25}$, —O$C_7H_{15}$, —O$C_{14}H_{29}$,

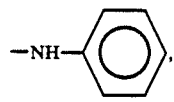

—N($CH_2CH_2OH$)$_2$, or —NH$CH_2CH_2OH$, and $M_1$ and $M_2$, which may be the same or different, each represents H, Na, K, Li, $NH_4$, $NH(CH_2OH)_3$, or $NH_2(CH_2OH)_2$.

* * * * *